United States Patent
Grace et al.

(10) Patent No.: US 12,062,290 B1
(45) Date of Patent: Aug. 13, 2024

(54) ADAPTIVE DISPATCH AND ROUTING OF AUTONOMOUS VEHICLES BASED ON THRESHOLD DISTANCES

(71) Applicant: GM Cruise Holdings, LLC, San Francisco, CA (US)

(72) Inventors: Nestor Grace, San Francisco, CA (US); Dogan Gidon, Berkeley, AL (US); Diego Plascencia-Vega, San Francisco, CA (US); Clifton Trigg Hutchinson, Dallas, TX (US)

(73) Assignee: GM Cruise Holdings LLC, San Francisco, CA (US)

( * ) Notice: Subject to any disclaimer, the term of this patent is extended or adjusted under 35 U.S.C. 154(b) by 490 days.

(21) Appl. No.: 17/184,914

(22) Filed: Feb. 25, 2021

(51) Int. Cl.
| | |
|---|---|
| *G08G 1/00* | (2006.01) |
| *G06Q 10/02* | (2012.01) |
| *G06Q 10/0631* | (2023.01) |
| *G06Q 50/40* | (2024.01) |
| *H04W 4/02* | (2018.01) |

(52) U.S. Cl.
CPC ............ *G08G 1/202* (2013.01); *G06Q 10/02* (2013.01); *G06Q 10/06312* (2013.01); *G06Q 50/40* (2024.01); *H04W 4/025* (2013.01)

(58) Field of Classification Search
CPC ...... H04W 4/029; G05D 1/0088; G01C 21/34
See application file for complete search history.

(56) References Cited

U.S. PATENT DOCUMENTS

| | | | |
|---|---|---|---|
| 2015/0339928 A1* | 11/2015 | Ramanujam ........... G08G 1/202 701/23 |
| 2016/0364823 A1* | 12/2016 | Cao .................... G01C 21/3438 |
| 2018/0267536 A1* | 9/2018 | Goldberg ............. G05D 1/0212 |
| 2019/0072964 A1* | 3/2019 | Nix ......................... G06Q 10/02 |
| 2022/0097734 A1* | 3/2022 | Limaye .................. G08G 1/123 |

* cited by examiner

*Primary Examiner* — Pakee Fang (57) ABSTRACT

The disclosed technology provides solutions for implementing dynamic autonomous vehicle (AV) dispatch services. A process of the disclosed technology can include steps for receiving a dispatch request from a mobile device associated with a user, wherein the dispatch request comprises a first pick-up location associated with the user, dispatching a first autonomous vehicle (AV) to the first pick-up location in response to the dispatch request, and automatically receiving an updated location of the mobile device associated with the user. In some aspects, the process can further include steps for determining a second pick-up location based on a change between the first pick-up location and the updated location, and transmitting an updated dispatch request based on the updated location of the mobile device. Systems and machine-readable media are also provided.

17 Claims, 5 Drawing Sheets

ADAPTIVE DISPATCH AND ROUTING OF AUTONOMOUS VEHICLES BASED ON THRESHOLD DISTANCES

BACKGROUND

1. Technical Field

The subject technology relates to solutions for dispatching autonomous vehicles (AVs) and in particular, for automatically adapting or updating ride-hailer pick-up locations based on detected changes in ride-hailer location.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions conventionally performed by human drivers, such as modifying rendezvous (pick-up) locations based on changes in ride hailer location.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology but is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

When providing ride services, human drivers of conventional (non-autonomous) vehicles routinely update their intended pick-up locations based on changing locations of the ride-hailer. In a typical scenario, the ride-hailer (or rider, passenger, user, etc.), may contact the driver, e.g., using a mobile device, to provide instructions needed to change an agreed-upon pick-up (rendezvous) site. This process can be onerous for both the ride-hailer and the driver, who may be unfamiliar with the environs surrounding the pick-up location. Additionally, in ride sharing scenarios, closer dispatch vehicles may be available, but unable to change their dispatch instructions to better serve the ride-hailer.

Aspects of the disclosed technology address the foregoing limitations of conventional dispatch operations, by providing systems, methods, and machine-readable media that provide solutions for dynamically updating a vehicle dispatch. The dynamic dispatch solutions described here can be applied to the dispatch of autonomous vehicles (AVs), for example, that are used to provide a ride-sharing service. As discussed in further detail below, individual AVs can belong to an AV fleet, whereby dispatching operations are coordinated across one or more vehicles in a given geographic area, or of a particular service type.

In some aspects, AV dispatch is triggered from a dispatch request generated by a user/passenger/ride hailer, e.g., using a processor-based device, such as a smart phone, or tablet computer. The request can be received at a dispatch system, and used to trigger a ride pickup by an AV fleet vehicle. The AV chosen to respond to the request can be selected based on any of a variety of characteristics, including but not limited to: AV distance from the ride-hailer, AV type, a specified user preference, a requested time of arrival, and/or traffic conditions, etc.

During dispatch, a location of the ride-hailer can be monitored, for example, through continuous or periodic location updates received from an associated mobile device. Based on changes in the user's location, the pick-up location of the dispatched vehicle can be updated or modified. In some instances, based on changes in ride-hailer location, the responding dispatch vehicle may be changed altogether. Further examples of the dynamic dispatch features contemplated by the invention are discussed with respect to FIG. 1, below.

Figure 1:
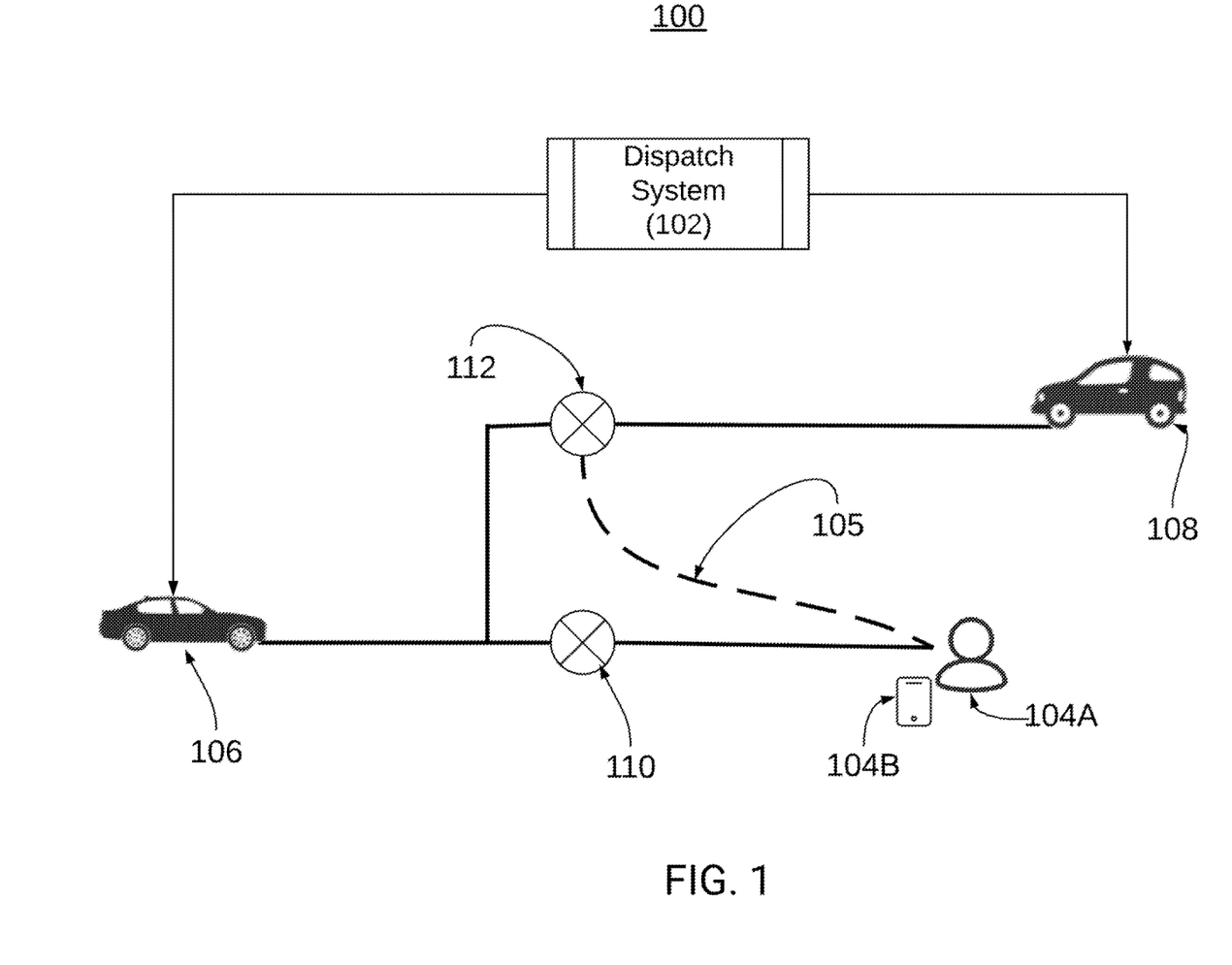
FIG. 1 illustrates an example environment in which dynamic dispatch system of the disclosed technology can be implemented.

FIG. 1 illustrates an example environment 100 in which a dispatch system 102 of the disclosed technology can be implemented. In the example of FIG. 1, dispatch system 102 can be configured to receive ride requests from one or more ride-hailers/users, such as ride-hailer 104A, for example, via an associated mobile device 104B. As disclosed herein, mobile device 104B can be any processor-based device capable of communicating directly or indirectly with dispatch system 102, e.g., over a communication network, such as the Internet. As discussed in further detail below, dispatch system 102 can also receive location updates from mobile device 104B that indicate recent locations of an associated user 104A. Location updates can be received in a continuous or periodic manner, depending on the desired configuration. Subsequently, in response to changes in the user's location, dispatch system 102 can transmit dispatch updates to one or more fleet AVs, e.g., AVs 106, 108 to re-route to a new pick-up location. In some instances, the dispatched vehicle may be changed to provide a more efficient pick-up to the ride hailer, as discussed in further detail, below.

By way of example, ride-hailer/user 104A can request an AV pickup service using mobile device 104B. In response to the request, dispatch system 102 dispatches AV 106 to a first pick-up location 110 indicated or selected by user 104A. The first pick-up location 110 can be indicated as the user's preferred rendezvous location, for example, in the user's dispatch request. Alternatively, the first pick-up location may be selected or suggested by dispatch system 102, for example, based on a known location of user 104A. In some instances, the first pick-up location 110 may be automatically selected or suggested by dispatch system 102 if it represents the closest roadway access point or other suitable pick-up location that is proximate to the ride-hailer 104A, such as a street corner outside of a park, mall, or shopping venue that is not otherwise accessible by vehicle.

In some instances, the ride-hailer 104A may move or change locations before AV 106 arrives at first pick-up location 110. For example, ride-hailer/user 104A may decide to walk along a sidewalk, or walking path 105 in a direction away from first pick-up location 110. In such cases, a location of mobile device 104B, and thereby the ride-hailer 104A, can be automatically tracked by dispatch system 102 and used to infer a route taken by the user, and to update or modify the AV dispatch accordingly. For example, in response to changes in the ride hailer's location, new or additional dispatch instructions may be transmitted by dispatch system 102 to AV 106 to cause AV 106 to re-route to a new location, e.g., second pick-up location 112. In some instances, dispatch instructions may be transmitted from dispatch system 102 to two or more AVs, for example, to update dispatch operations being implemented by multiple vehicles. For example, detected changes in the location of ride-hailer 104A—such as movement toward second pick-up location 112—may cause dispatch system 102 to provide updated dispatch instructions to first AV 106 (e.g., to stop or discontinue the pick-up), and also to provide dispatch instructions to second AV 108, e.g., to cause second AV 108 to provide services by meeting ride-hailer 104A at the second pick-up location 112B. Changes in the dispatching vehicle can be made in response to changes in rendezvous location (e.g., from first pick-up location 110 to second pick-up location 112), or based on other factors, including but not limited to: changes in intended vehicle occupancy or loads, changes in dispatch relating to one or more other fleet vehicles, changes in indicated or inferred needs of the user/ride-hailer, changes to traffic conditions, and/or changes to dispatch vehicle availability, etc.

Figure 2:
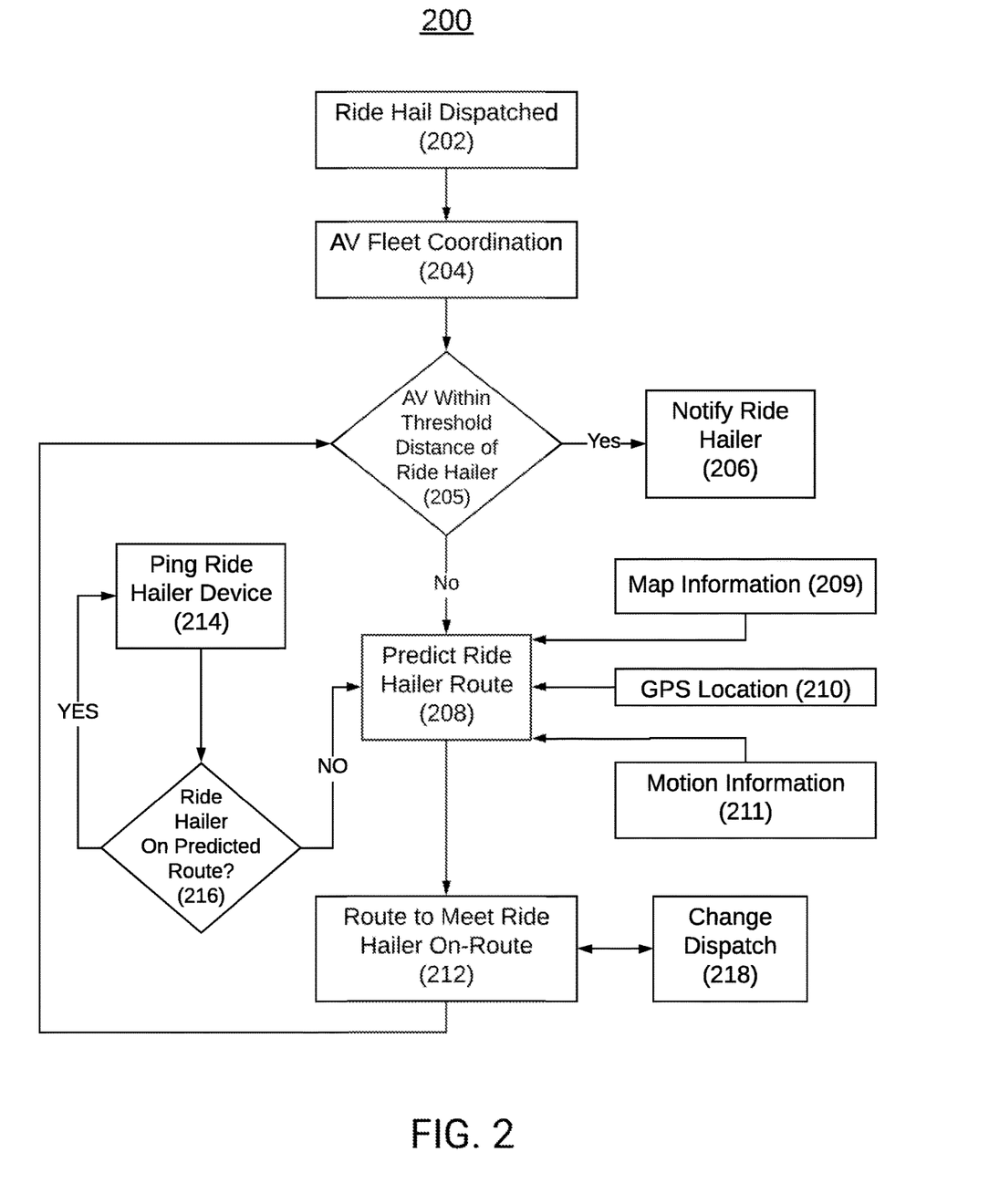
FIG. 2 illustrates a block diagram of an example process for implementing a dynamic dispatch process, according to some aspects of the disclosed technology.

FIG. 2 illustrates a block diagram of an example process 200 for implementing a dynamic AV dispatch, according to some aspects of the disclosed technology. Process 200 begins with block 202, where a ride-hail request is dispatched. As discussed above, the request can be originated by a mobile device, such as a smart phone, for example, when a user/ride-hailer make an AV request. The dispatch request, once received at a ride dispatch system (e.g., dispatch system 102, discussed above), can cause the dispatch system to identify and select at least one AV to respond. This fleet coordination process (block 204) can take into consideration multiple factors and/or considerations, including but not limited to: AV proximity to the pick-up location, AV type, rider preferences, traffic conditions, time to arrival at interception or pick-up location, weather conditions, AV repair status, AV fuel or charge status, etc.

Once a responding AV has been identified and selected, the vehicle can be dispatched to a pick-up location specified by the ride-hailer. In some approaches, the pick-up location may be automatically determined by the AV and/or dispatch system; for example, pre-determined pick-up locations at an airport terminal may be used. In other aspects, pick-up locations may be suggested or identified based on traffic conditions, AV accessibility limitations, etc. By way of example, a user requesting a ride service from within a sporting venue, such as a ballpark, that is inaccessible by vehicle, may be provided with a recommended pick-up location, e.g., proximate to a nearby roadway that can be reached by a responding AV.

Once the AV is dispatched to the pick-up location, periodic determinations are made regarding a proximity between the AV and the ride-hailer/user and/or the pick-up location (block 205). If the dispatched AV is determined to be within a predetermined threshold distance of the ride hailer, then a notification can be sent to a mobile device associated with the ride-hailer, for example, to indicate that the vehicle is nearby or waiting (block 206). Threshold distances between dispatched AV and ride-hailer can be preconfigured and/or based on user preferences/settings. For example, notifications may be sent to the ride-hailers device when the AV is within 500 m, 200 m, or 50 m, of the pick-up location. It is understood that other threshold distances and/or configurations are contemplated, without departing from the scope of the disclosed technology. In some instances, ride-hailer notifications may provide updated estimated time of arrival (ETA) information, so that the ride-hailer can be apprised of ongoing status updates of the dispatched vehicle in the case of unforeseen delays.

Alternatively, if at block 205, it is determined that the dispatched AV is not within a threshold distance of the ride-hailer, and/or pick-up location, process 200 proceeds to block 208 in which a route or trajectory of the ride-hailer is predicted. For example, if the ride-hailer is detected to be moving, e.g., deviating from the initial (first) pick-up location, then a path or trajectory of the ride-hailer can be estimated. Such approaches can facilitate the identification/determination of one or more alternative pick-up locations where the dispatched AV may rendezvous with the user. Predictions regarding user's path or trajectory can be based on any available information, including map information (209), location information (e.g., GPS data) of the mobile device (210), and/or motion information (211), for example, that is measured using sensors (e.g., gyroscopic sensors, and/or accelerometers) of the user' mobile device.

By resolving the user's path/trajectory, a new (second) pick-up location can be identified and/or selected, causing the dispatched AV to change course to the new pick-up location (block 212). Location information for the user can be updated by periodically monitoring a location of the user's mobile device (ride hailing device) (block 214). New detected locations of the mobile device can be used to determine if the ride-hailer is on a path corresponding with a predicted route (216). In such approaches, so long as the ride-hailer location is congruent with the predicted route, the mobile device is periodically monitored (e.g., process 200 loops back to block 214), and no changes to the dispatch are made. Alternatively, if a detected location of the user's mobile device indicates that the user is not on a predicted route, process 200 can advance again to block 208, and a new path prediction for the user can be determined.

Figure 3:
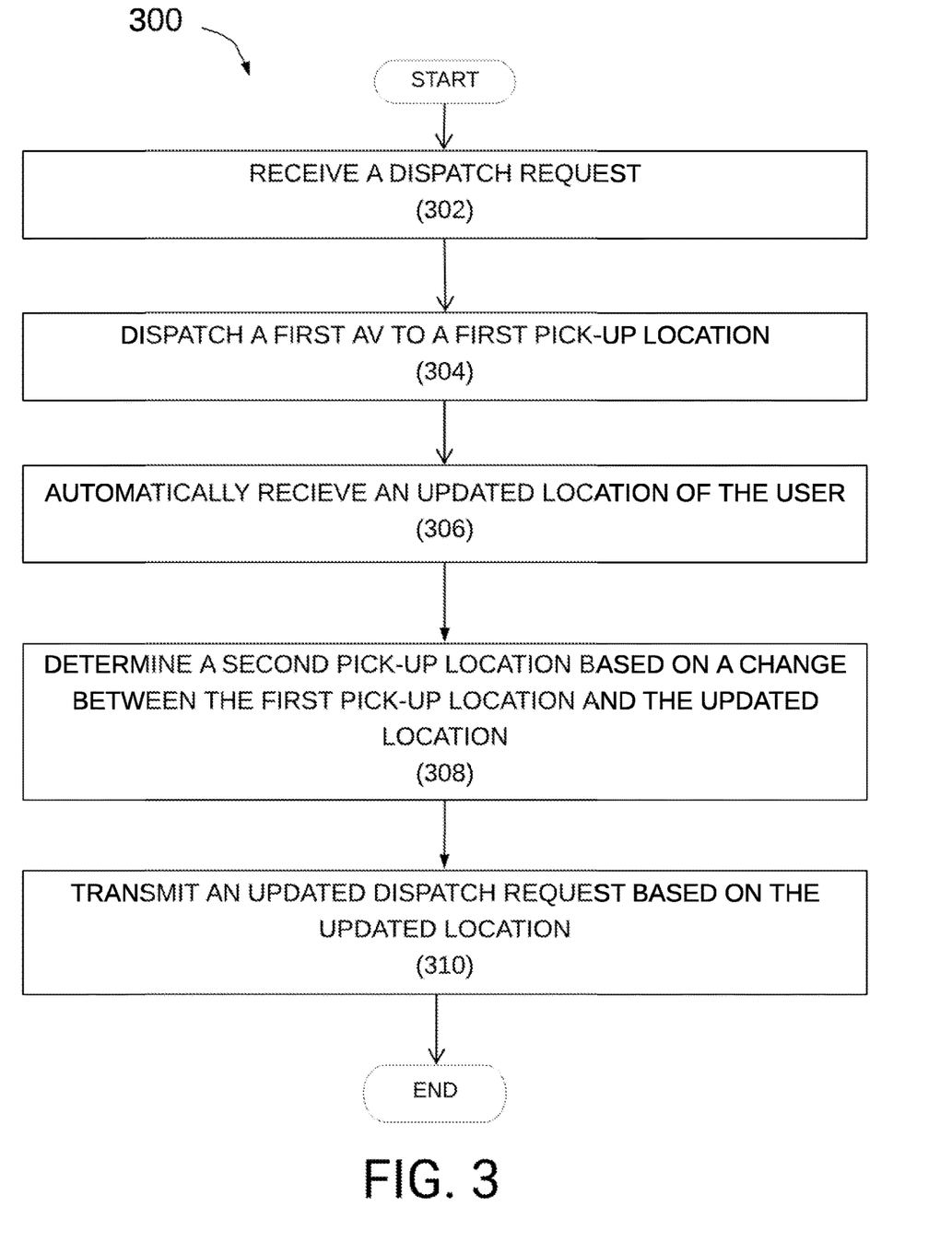
FIG. 3 illustrates a block diagram of a process for performing a dynamic dispatch process, according to some aspects of the disclosed technology.

FIG. 3 illustrates a block diagram of a process for performing a dynamic dispatch process. Process 300 begins with step 302, in which a dispatch (ride-hail) request is received, for example, at a dispatch system such as dispatch system 102. As discussed above, the dispatch request can include a request for pick-up at a specified location (e.g., a first pick-up location). Alternatively, the pick-up location may be selected or recommended by the dispatch system. Subsequently, at step 304, a first AV is dispatched to the first pick-up location.

At step 306, an updated location of the user is automatically received by the dispatch system. In some implementations, as discussed above, a location of a mobile device associated with the user (e.g., the ride-hailing device) may be polled periodically, e.g., to determine if the user's location has deviated from the first pick-up location and/or a predicted path.

At step 308, a second pick-up location is determined/identified based on a change between the first pick-up location and the updated location. As discussed above, changes in the user's location can be used to predict a path or trajectory of the user, and can thereby be used to infer, select, or suggest an alternate (second) pick-up location. In some approaches, the determined pick-up location may change repeatedly, depending on an arrival time of the dispatched AV, and a frequency of location change by the user/ride hailer.

In step 310, an updated dispatch request is transmitted to the first AV based on the updated location. In effect, the updated dispatch request can cause the first AV to alter its navigation and routing operations in a manner necessary to drive to the second pick-up location. In some aspects, the updated dispatch request may be sent to multiple vehicles, such as to cause the first AV to cancel its dispatch, and to cause a different (second) AV to respond to the updated ride hail request. For example, in situations where a vehicle other than the initially responding AV may be in a better location to respond to the ride request the first dispatched vehicle may be removed from service, and a different AV may be called to respond in its place.

Figure 4:
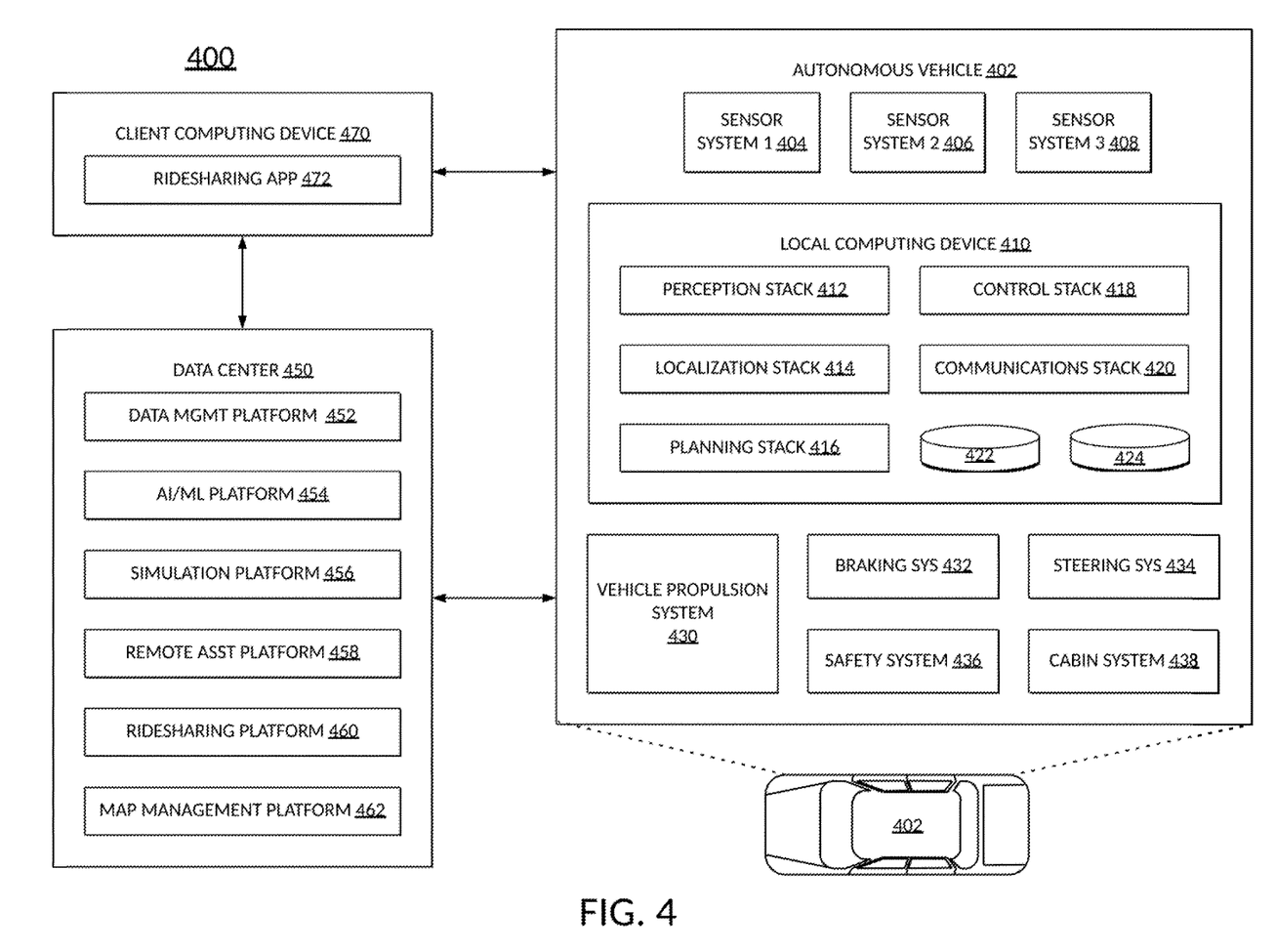
FIG. 4 illustrates an example system environment that can be used to facilitate AV dispatch and operations, according to some aspects of the disclosed technology.

Turning now to FIG. 4 illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, brake pads, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an HD geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data as discussed further below with respect to FIG. 2 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and client computing device 470.

These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, a ridesharing platform 460, and map management system platform 462, among other systems.

Data management platform 452 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management system platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management system platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management system platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management system platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, UAVs, satellites, third-party mapping services, and other sources of geospatially referenced data. The raw data can be processed, and map management system platform 462 can render base representations (e.g., tiles (2D), bounding volumes (3D), etc.) of the AV geospatial data to enable users to view, query, label, edit, and otherwise interact with the data. Map management system platform 462 can manage workflows and tasks for operating on the AV geospatial data. Map management system platform 462 can control access to the AV geospatial data, including granting or limiting access to the AV geospatial data based on user-based, role-based, group-based, task-based, and other attribute-based access control mechanisms. Map management system platform 462 can provide version control for the AV geospatial data, such as to track specific changes that (human or machine) map editors have made to the data and to revert changes when necessary. Map management system platform 462 can administer release management of the AV geospatial data, including distributing suitable iterations of the data to different users, computing devices, AVs, and other consumers of HD maps. Map management system platform 462 can provide analytics regarding the AV geospatial data and related data, such as to generate insights relating to the throughput and quality of mapping tasks.

In some embodiments, the map viewing services of map management system platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Figure 5:
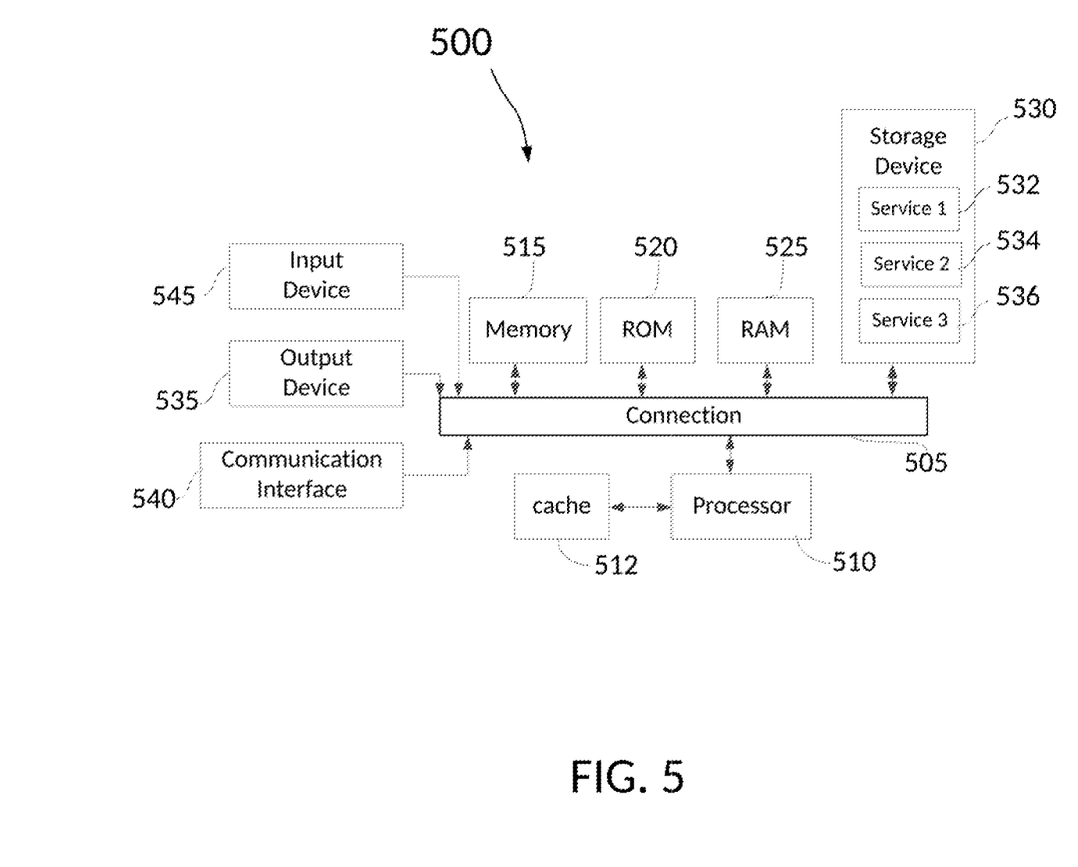
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up internal computing system 510, remote computing system 550, a passenger device executing the rideshare app 570, internal computing device 530, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A system comprising:
one or more processors; and
a computer-readable medium comprising instructions stored therein, which when executed by the processors, cause the processors to perform operations comprising:
   receiving a dispatch request from a mobile device associated with a user, wherein the dispatch request comprises a first pick-up location associated with the user;
   dispatching a first autonomous vehicle (AV) to the first pick-up location in response to the dispatch request;
   automatically receiving an updated location of the mobile device associated with the user;
   determining a distance between the first AV and the updated location of the mobile device associated with the user;
   in response to determining that the distance between the first AV and the updated location of the mobile device associated with the user exceeds a threshold distance, predicting a travel trajectory of the user based on the updated location of the mobile device;
   determining a second pick-up location based on the predicted travel trajectory of the user; and
   transmitting an updated dispatch request based on the updated location of the mobile device, wherein the updated dispatch request is configured to cause a second AV to navigate to the second pick-up location.

2. The system of claim 1, wherein the updated dispatch request is transmitted to the first AV, and wherein the updated dispatch request is configured to cause the first AV to re-route to the second pick-up location.

3. The system of claim 1, wherein the updated dispatch request is transmitted to the first AV, and wherein the updated dispatch request is configured to cause the first AV to cease routing to the first pick-up location.

4. The system of claim 1, wherein determining the second pick-up location based on a change between the first pick-up location and the updated location, further comprises:
   estimating a future location of the user at an approximate time of intercept by the first AV.

5. The system of claim 1, wherein automatically receiving the updated location of the mobile device associated with the user further comprises:
   querying the mobile device to determine if a location of the mobile device corresponds with first pick-up location.

6. The system of claim 1, wherein the updated dispatch request is sent to two or more AVs.

7. A computer-implemented method, comprising:
receiving a dispatch request from a mobile device associated with a user, wherein the dispatch request comprises a first pick-up location associated with the user;
dispatching a first autonomous vehicle (AV) to the first pick-up location in response to the dispatch request;
automatically receiving an updated location of the mobile device associated with the user;
determining a distance between the first AV and the updated location of the mobile device associated with the user;
in response to determining that the distance between the first AV and the updated location of the mobile device associated with the user exceeds a threshold distance, predicting a travel trajectory of the user based on the updated location of the mobile device;

determining a second pick-up location based on the predicted travel trajectory of the user; and transmitting an updated dispatch request based on the updated location of the mobile device, wherein the updated dispatch request is configured to cause a second AV to navigate to the second pick-up location.

8. The method of claim 7, wherein the updated dispatch request is transmitted to the first AV, and wherein the updated dispatch request is configured to cause the first AV to re-route to the second pick-up location.

9. The method of claim 7, wherein the updated dispatch request is transmitted to the first AV, and wherein the updated dispatch request is configured to cause the first AV to cease routing to the first pick-up location.

10. The method of claim 7, wherein determining the second pick-up location based on a change between the first pick-up location and the updated location, further comprises:

estimating a future location of the user at an approximate time of intercept by the first AV.

11. The method of claim 7, wherein automatically receiving the updated location of the mobile device associated with the user further comprises:

querying the mobile device to determine if a location of the mobile device corresponds with first pick-up location.

12. The method of claim 7, wherein the updated dispatch request is sent to two or more AVs.

13. A non-transitory computer-readable storage medium comprising instructions stored therein, which when executed by one or more processors, cause the processors to perform operations comprising:

receiving a dispatch request from a mobile device associated with a user, wherein the dispatch request comprises a first pick-up location associated with the user;

dispatching a first autonomous vehicle (AV) to the first pick-up location in response to the dispatch request;

automatically receiving an updated location of the mobile device associated with the user;

determining a distance between the first AV and the updated location of the mobile device associated with the user;

in response to determining that the distance between the first AV and the updated location of the mobile device associated with the user exceeds a threshold distance, predicting a travel trajectory of the user based on the updated location of the mobile device;

determining a second pick-up location based on the predicted travel trajectory of the user; and transmitting an updated dispatch request based on the updated location of the mobile device, wherein the updated dispatch request is configured to cause a second AV to navigate to the second pick-up location.

14. The non-transitory computer-readable storage medium of claim 13, wherein the updated dispatch request is transmitted to the first AV, and wherein the updated dispatch request is configured to cause the first AV to re-route to the second pick-up location.

15. The non-transitory computer-readable storage medium of claim 13, wherein the updated dispatch request is transmitted to the first AV, and wherein the updated dispatch request is configured to cause the first AV to cease routing to the first pick-up location.

16. The non-transitory computer-readable storage medium of claim 13, wherein determining the second pick-up location based on a change between the first pick-up location and the updated location, further comprises:

estimating a future location of the user at an approximate time of intercept by the first AV.

17. The non-transitory computer-readable storage medium of claim 13, wherein automatically receiving the updated location of the mobile device associated with the user further comprises:

querying the mobile device to determine if a location of the mobile device corresponds with first pick-up location.

* * * * *